United States Patent
Igawa

(10) Patent No.: US 7,543,677 B2
(45) Date of Patent: Jun. 9, 2009

(54) OBJECT DETECTION SYSTEM, PROTECTION SYSTEM, AND VEHICLE

(75) Inventor: Tadahiro Igawa, Minato-ku (JP)

(73) Assignee: Takata Corporation, Tokyo (JP)

( * ) Notice: Subject to any disclaimer, the term of this patent is extended or adjusted under 35 U.S.C. 154(b) by 459 days.

(21) Appl. No.: 11/384,536

(22) Filed: Mar. 20, 2006

(65) Prior Publication Data

US 2006/0213714 A1    Sep. 28, 2006

(30) Foreign Application Priority Data

Mar. 22, 2005 (JP) ............... 2005-082827

(51) Int. Cl.
*B60R 21/34* (2006.01)

(52) U.S. Cl. .......... 180/274; 280/735; 280/730.1; 701/45; 296/187.04

(58) Field of Classification Search ........... 180/274; 280/735, 730.1; 701/45; 296/187.04
See application file for complete search history.

(56) References Cited

U.S. PATENT DOCUMENTS

| | | | |
|---|---|---|---|
| 5,936,549 A | 8/1999 | Tsuchiya | |
| 6,408,237 B1 * | 6/2002 | Cho | 701/45 |
| 6,510,914 B2 | 1/2003 | Ishizaki et al. | |
| 6,516,278 B1 | 2/2003 | Ishizaki et al. | |
| 6,519,519 B1 * | 2/2003 | Stopczynski | 701/45 |
| 6,561,301 B1 | 5/2003 | Hattori et al. | |
| 6,784,792 B2 | 8/2004 | Mattes et al. | |
| 7,143,856 B2 | 12/2006 | Takahashi et al. | |
| 7,415,337 B2 * | 8/2008 | Hau et al. | 701/45 |
| 2003/0154011 A1 * | 8/2003 | Rao et al. | 701/45 |
| 2004/0107033 A1 * | 6/2004 | Rao et al. | 701/45 |
| 2004/0172629 A1 | 9/2004 | Tene et al. | |
| 2004/0186643 A1 | 9/2004 | Tanaka et al. | |

FOREIGN PATENT DOCUMENTS

| | | |
|---|---|---|
| DE | 10 2004 012 478 A | 10/2004 |
| DE | 10 2004 012 478 A1 | 10/2004 |
| EP | 1 426 252 | 6/2004 |
| EP | 1 500 562 A1 | 1/2005 |
| JP | 10-194158 A | 7/1998 |
| JP | 11-052064 A * | 2/1999 |
| JP | 2000-025562 A | 1/2000 |

(Continued)

OTHER PUBLICATIONS

A Search Report dated Oct. 31, 2006, from the European Patent Office in corresponding European Application No. 06 00 4718.

(Continued)

*Primary Examiner*—Ruth Ilan
(74) *Attorney, Agent, or Firm*—Fitch, Even, Tabin & Flannery

(57) ABSTRACT

A system of detecting an object existing at the periphery of a vehicle is provided that is effective in reducing repair cost for a vehicle. In one form, a protection system installed in a vehicle is adapted to detect an object existing at the periphery of the vehicle through a camera sensor, determine, based on the detected information, whether the object is a vulnerable road user (person), and change the operation mode of outside protection devices according to the body size of the vulnerable road user.

8 Claims, 11 Drawing Sheets

FOREIGN PATENT DOCUMENTS

| | | | |
|---|---|---|---|
| JP | 2002-303671 A | | 10/2002 |
| JP | 2004-145660 A | * | 5/2004 |
| JP | 2004-196239 A | | 7/2004 |
| JP | 2004-268627 A | | 9/2004 |
| JP | 2005-067404 A | * | 3/2005 |
| JP | 2005-297755 A | * | 10/2005 |
| WO | 2004/021546 A2 | | 3/2004 |
| WO | WO 2004/021546 A2 | | 3/2004 |
| WO | WO 2004.021546 A3 | | 3/2004 |

OTHER PUBLICATIONS

A search report dated Aug. 9, 2006 from the European Patent Office in corresponding European Application No. 06004718.02421.

* cited by examiner

OBJECT DETECTION SYSTEM, PROTECTION SYSTEM, AND VEHICLE

FIELD OF THE INVENTION

The present invention relates to an object detection technology for detecting an object existing at the periphery of a vehicle such as an automobile.

BACKGROUND OF THE INVENTION

Conventionally, various technologies for detecting an object existing at the periphery of a vehicle such as an automobile have been proposed. For example, disclosed in Japanese Patent Unexamined Publication No. 2004-196239 is a device which detects an object existing at the periphery of a vehicle when the object actually collides with the vehicle and distinguishes the kind of the object. Though such a device may detect an object existing at the periphery of a vehicle, the device is adapted to conduct detection when the object actually collides with the vehicle so that information about the object distinguished is not used to control a device such as protection device which is activated during the vehicle collision. Therefore, the protection device is activated not only a case where the object is a pedestrian as a primary object to be protected but also a case where the object is a thing not a pedestrian such as a vehicle or a fixed object. Accordingly, there may be a problem of increasing the repair cost (maintenance cost) for the protection device after operation.

SUMMARY OF THE INVENTION

The present invention has been made in view of the above problem and it is an object of the present invention to provide an effective technology for reducing repair cost for a vehicle in a system detecting an object existing at the periphery of the vehicle.

For achieving the object, the present invention is configured. The present invention is typically adopted to a technology for discriminating an object stuck in the event of a vehicle collision of a vehicle such as an automobile, a bus, a train, or a ship.

The first form of the present invention for achieving the aforementioned object is an object detection system which comprises at least a detecting means and a discriminating means.

The detecting means of this invention is mounted on a vehicle and is a means for detecting information about shape of an object existing at the periphery of the vehicle without touching the object. Therefore, it is possible to detect information about shape of the object through the detecting means before the object collides with the vehicle.

The "periphery of the vehicle" used here means an area around the subject vehicle and may include not only an area in front of the vehicle but also areas on sides of the vehicle. The "object" used here may be a vehicle other than the subject vehicle such as a running vehicle, a vehicle at a stop, and a parked vehicle, a fixed object such as a telephone pole, a guardrail, a road sign, a house, a fence, and a falling object on a road, and a moving or not-moving vulnerable road user such as a pedestrian, a person on a bicycle, and a person on a wheelchair. The "information about shape of the object" used here may be the height, the width, the projected area, or the volume of the object. The relative movement between the subject vehicle and the object includes a form in which these move in directions coming closer to each other, a form in which these move such that one overtakes the other from the behind, a form in which these run parallel to each other, and a form in which one comes across the other.

Specific suitable examples of the detecting means of this invention include various means capable of detecting an object such as a CCD camera, a C-MOS camera, a laser beam sensor, a millimeter wave sensor, a far-infrared camera, a near-infrared camera, a visible-light camera, a dynamic range camera for visible-light and near-infrared range, and an ultrasonic sensor.

The discriminating means of this invention is a means for determining, based on the information detected by the detecting means, whether the object is a person or not before the occurrence of a vehicle collision. The discriminating means determines that the object is a person when the object detected by the detecting means is a pedestrian, a person on a bicycle, or a person on a wheelchair. Information determined by the discriminating means is suitably used for controlling a target device which is enough to be actuated only when the object is a person, for example, a protection device which is actuated to protect a person existing outside of the vehicle in the event of a vehicle collision.

As described in the above, since the object detection system has a structure of detecting an object existing at the periphery of the vehicle before the occurrence of a vehicle collision and determining whether the object is a person or not, the object detection system is effective for controlling a target device which is enough to be actuated only when the object is a person such that the target device is actuated only when the object is a person. Therefore, the target device is prevented from being wastefully actuated for an object not a person such as a vehicle or a fixed object, thus reducing the repair cost (maintenance cost) relating to the vehicle such as the repair cost of the target device.

The second form of the present invention for achieving the aforementioned object is an object detection system described hereinbelow. In this object detection system, the discriminating means as described in the first form is adapted to discriminate, based on the information detected by the detecting means, the body size of a person when determining that the object is the person. Therefore, the body size of the person such as the height (body length), the width (the chest width, the shoulder width, or the like), the projected area, or the volume of the person is discriminated by the discriminating means before the occurrence of a vehicle collision. The information discriminated by the discriminating means is suitably used for controlling a target device of which operation mode is variable according to the body size of the person, typically such as a protection device of which operation mode is variable according to the body size of the person for the purpose of protecting the person existing outside the vehicle. For example, in case of a protection device having an airbag to be inflated and deployed for protection, the inflation timing, the inflation pressure, and/or the inflation speed of the airbag are variable according to the body size of the person.

Since the object detection system in the second form has a structure of detecting an object existing at the periphery of the vehicle, determining whether the object is a person or not, and discriminating the body size of the person, the object detection system is effective especially for controlling a target device of which operation mode is variable according to the body size of the person.

The third form of the present invention for achieving the aforementioned object is an object detection system described hereinbelow. In this object detection system, the detecting means as described in the first or second forms is adapted to detect at least one of the relative speed and the relative position between the vehicle and the object without touching the object.

The object detection system of the third form having the aforementioned structure achieves a structure not only capable of reducing the repair cost relating to the vehicle but also capable of detecting at least one of the relative speed and the relative position between the vehicle and the object in addition to the information about shape of the object.

The fourth form of the present invention for achieving the aforementioned object is an object detection system described hereinbelow. This object detection system further comprises a collision predicting means in addition of the components of the third form. The collision predicting means is a means for predicting, based on at least of the relative speed and the relative position detected by the detecting means, a collision between the vehicle and the object.

The object detection system of the fourth form achieves a structure capable of predicting a collision between the vehicle and the object based on the information detected by the detecting means.

The fifth form of the present invention for achieving the aforementioned object is an object detection system described hereinbelow. This object detection system of the fifth form further comprises a collision detecting means in addition of the components described in any one of the first through the fourth forms. The collision detecting means is a means for detecting that a collision between the vehicle and the object occurs.

Specific suitable examples of the collision detecting means of this invention include various conventionally known sensors capable of detecting the occurrence of collision such as an acceleration-type crash sensor which detects the occurrence of a collision based on the acceleration acting on the vehicle in the event of the collision, an optical-cable-type crash sensor, a crash sensor of a type which detects structural displacement of the vehicle, a crash sensor of a type which detects rate of structural displacement of the vehicle, an electrode-switch-type crash sensor, a crash sensor of a type which detects change of magnetic field, and a crash sensor of a type which detects change of bladder inner pressure.

The object detection system of the fifth form achieves a structure capable of detecting that a collision between the vehicle and the object occurs.

The sixth form of the present invention for achieving the aforementioned object is a protection system described hereinbelow. This protection system of the sixth form comprises at least an object detection system as described in any one of the first through fifth forms, a protecting means, and a control means.

The protecting means of this invention is a means which is operative to reduce impact acting on the object in the event of a vehicle collision. The protecting means may have a structure in which an airbag itself is inflated and deployed to cover the protective area or a buffering member (pad member) having a rectangular shape or a plate-like shape flaps up onto the protective area by a driving means such as a driving arm or an airbag.

The control means is a means for controlling the operation mode of the protecting means and is adapted to output an actuation signal to the protecting means when the discriminating means determines that the object is a person. The control means described in this claim and the control means described in other claims each typically comprise a CPU (central processing unit), an input/output device, a storing device, and a peripheral device.

The protection system of the sixth form has a structure of outputting the actuation signal to the protecting means only when the object is a person, thereby preventing the protecting means from being wastefully actuated for the object not a person such as a vehicle or a fixed object and thus reducing the repair cost (maintenance cost) relating to the protecting means after operation.

The seventh form of the present invention for achieving the aforementioned object is a protection system described hereinbelow. The protection system of the seventh form comprises at least an object detection system as described in the second form, a protecting means, and a control means.

The protecting means of this invention is a means which is operative to reduce impact acting on the object in the event of a vehicle collision and has the same structure of the protecting means described in the sixth form.

The control means of this invention is a means for controlling the operation mode of the protecting means and is adapted such that when it is determined that the object is a person and the body size of the person is discriminated, the control means controls the protecting means to be actuated in a different operation mode according to the body size of the person. Specifically, the following first through fourth aspects may be employed. In the first aspect, the timing of outputting the actuation signal to the protecting means is varied according to the body size of the person. In case where the protection means achieves protection by an airbag inflated and deployed, the timing for inflating the airbag is varied according to the body size of the person. In the second aspect, the force of the protecting means to be applied to the person is varied according to the body size of the person. In case where the protection means achieves protection by an airbag inflated and deployed, the inflation pressure and/or the inflation speed of the airbag is varied according to the body size of the person. In the third aspect, in case where the protecting means is composed of a plurality of protecting devices, the actuation signals for the respective protecting devices are controlled to be outputted with or without time lag according to the body size of the person. In case where the protection means achieves protection by a plurality of airbags inflated and deployed, the inflation timing of each airbag is varied to be different from the other airbag(s) according to the body size of the person. In the fourth aspect, in case where the protecting means is composed of a plurality of protecting devices, the number and combination of the protecting devices to which actuation signals are outputted are varied according to the body size of the person. In case where the protection means achieves protection by a plurality of airbags inflated and deployed, the number and combination of the airbags to be inflated are varied according to the body size of the person.

Since the protection system of the seventh form has a structure of detecting an object existing at the periphery of the vehicle and determining whether the object is a person or not before the occurrence of a vehicle collision and further discriminating the body size of the person, the protection system is effective particularly for controlling the protecting means of which operation mode is variable according to the body size of the person.

The eighth form of the present invention for achieving the aforementioned object is a protection system described hereinbelow. The protection system of the eighth form comprises at least an object detection system as described in the third form, a collision predicting means, a protecting means, and a control means.

The collision predicting means of this invention is a means which predicts a collision between the vehicle and the object based on at least one of the relative speed and the relative position detected by the detecting means.

The protecting means of this invention is a means which is operative to reduce impact acting on the object in the event of a vehicle collision and has the same structure of the protecting means described in the sixth form.

The control means of this invention is a means for controlling the operation mode of the protecting means and is adapted such that when the discriminating means determines that the object is a person and the collision predicting means predicts a collision between the vehicle and the object, the control means outputs an actuation signal to the protecting means.

The protection system described in the eighth form achieves a structure of outputting an actuation signal to the protecting means when the object is a person and a collision between the vehicle and the object is predicted.

The ninth form of the present invention for achieving the aforementioned object is a protection system described hereinbelow. The protection system of the ninth form comprises at least an object detection system as described in the third form, a collision detecting means, a protecting means, and a control means.

The collision detecting means of this invention is a means which detects that a collision between the vehicle and the object occurs and has the same structure of the collision detecting means described in the fifth form.

The protecting means of this invention is a means which is operative to reduce impact acting on the object in the event of a vehicle collision and has the same structure of the protecting means described in the sixth form.

The control means of this invention is a means for controlling the operation mode of the protecting means and is adapted such that when the discriminating means determines that the object is a person and the collision detecting means detects that a collision between the vehicle and the object occurs, the control means outputs an actuation signal to the protecting means.

The protection system described in the ninth form achieves a structure of outputting an actuation signal to the protecting means when the object is a person and the occurrence of an actual collision between the vehicle and the object is detected.

The tenth form of the present invention for achieving the aforementioned object is a protection system described hereinbelow. In the protection system described in the tenth form, the protecting means as claimed in any one of the sixth through the ninth forms comprises at least a first protecting means, a second protecting means, and a third protecting means. The first protecting means is a protecting means which can work at a protective area on a front end of the vehicle. The second protecting means is a protecting means which can work at a protective area on a hood of the vehicle. The third protecting means is a protecting means which can work at a protective area on a front windshield of the vehicle. When the object is a person, it is envisioned that the person will lie over an area from a front end portion of the vehicle to a front windshield glass of the vehicle among the components of the vehicle in the event of collision. Therefore, by using the protecting means which can work at the protective area on the front end portion of the vehicle, the protective area on the hood of the vehicle, and the protective area on the front windshield of the vehicle according to this invention, the thorough protection of the person outside of the vehicle is achieved.

The eleventh form of the present invention for achieving the aforementioned object is a protection system described hereinbelow. The protection system of the eleventh form comprises at least a detecting means, a discriminating means, a protecting means, and a control means.

The detecting means of this invention is a means which is mounted on a vehicle and detects at least one of information about shape of an object existing at the periphery of the vehicle and information about relative speed between the vehicle and the object without touching said object.

The discriminating means of this invention is a means for determining, based on the information detected by the detecting means, whether the object is a person or not before the occurrence of a vehicle collision and has the same structure of the discriminating means described in the first form.

The protecting means of this invention is a means which is operative to reduce impact acting on the object in the event of a vehicle collision and has the same structure of the protecting means described in the sixth form.

The control means of this invention is a means for controlling the operation mode of the protecting means and is adapted such that when the discriminating means determines that the object is a person, the control means controls the protecting means to be actuated in a different operation mode according to the information detected by the detecting means. Specifically, the following first through fourth aspects may be employed. In the first aspect, the timing of outputting the actuation signal to the protecting means is varied according to the body size of the person and/or the relative speed. In case where the protection means achieves protection by an airbag inflated and deployed, the timing for inflating the airbag is varied according to the body size of the person and/or the relative speed. In the second aspect, the force of the protecting means to be applied to the person is varied according to the body size of the person and/or the relative speed. In case where the protection means achieves protection by an airbag inflated and deployed, the inflation pressure and/or the inflation speed of the airbag is varied according to the body size of the person and/or the relative speed. In the third aspect, in case where the protecting means is composed of a plurality of protecting devices, the actuation signals for the respective protecting devices are controlled to be outputted with or without time lag according to the body size of the person and/or the relative speed. In case where the protection means achieves protection by a plurality of airbags inflated and deployed, the inflation timing of each airbag is varied to be different from the other airbag(s) according to the body size of the person and or the relative speed. In the fourth aspect, in case where the protecting means is composed of a plurality of protecting devices, the number and combination of the protecting devices to which the control means outputs actuation signals are varied according to the body size of the person and/or the relative speed. In case where the protection means achieves protection by a plurality of airbags inflated and deployed, the number and combination of the airbags to be inflated are varied according to the body size of the person and/or the relative speed.

Since the protection system of the eleventh form has a structure of controlling the protecting means to be actuated in a different operation mode according to the body size of the person and/or the relative speed, the optimization of protection of the person outside of the vehicle is achieved.

The twelfth form of the present invention for achieving the aforementioned object is a protection system described hereinbelow. In the protection system of the twelfth form, the protecting means as described in the eleventh form comprises at least a first protecting means, a second protecting means, and a third protecting means. The first protecting means is a protecting means which can work at a protective area on a front end of the vehicle. The second protecting means is a protecting means which can work at a protective area on a hood of the vehicle. The third protecting means is a protecting means which can work at a protective area on a front windshield of the vehicle.

When the discriminating means determines that the object is a person, the control means varies the number and combination of the first through third protecting means to which the control means outputs actuation signals according to the information detected by detecting means, thereby controlling the actuation signals to be outputted in different modes. For example, in case where the protection means achieves protection by a plurality of airbags inflated and deployed, the number and combination of the airbags to be inflated and deployed are varied according to the body size of the person and/or the relative speed.

Since the protection system of the twelfth form has a structure of varying the number and combination of the protecting means to be actuated according to the body size of the person and/or the relative speed, the optimization of protection of the person outside of the vehicle is achieved.

The thirteenth form of the present invention for achieving the aforementioned object is a protection system described hereinbelow. The protection system of the thirteenth form comprises at least a detecting means, a discriminating means, a protecting means, and a control means.

The detecting means of this invention is a means which is mounted on a vehicle and detects information about shape of an object existing at the periphery of the vehicle and information about relative speed between the vehicle and the object without touching the object.

The discriminating means of this invention is a means for determining, based on the information detected by the detecting means, whether the object is a person or not before the occurrence of a vehicle collision and has the same structure of the discriminating means described in the first form.

The protecting means of this invention is a means which is operative to reduce impact acting on the object in the event of a vehicle collision and has the same structure of the protecting means described in the sixth form.

The control means of this invention is a means for controlling the operation mode of the protecting means and is adapted such that when the discriminating means determines that the object is a person and the relative approach speed detected by the detecting means exceeds a predetermined threshold, the control means outputs an actuation signal to the protecting means. The relative approach speed is defined as relative speed between the vehicle and the object when moving closer to each other. The threshold (reference value) of the relative speed is set according to results of previously conducted tests or analyses. For example, a relative speed range having a high possibility of a vehicle collision and a relative speed range having a low possibility of a vehicle collision are evaluated and the threshold range is set between these ranges.

The protection system of the thirteenth form achieves a structure of outputting an actuation signal to the protecting means when the object is a person and the relative approach speed exceeds the predetermined threshold.

The fourteenth form of the present invention for achieving the aforementioned object is a protection system described hereinbelow. The protection system of the fourteenth form comprises at least a detecting means, a discriminating means, a protecting means, and a control means.

The detecting means of this invention is a means which is mounted on a vehicle and detects information about shape of an object existing at the periphery of the vehicle and information about relative speed between the vehicle and the object without touching the object.

The discriminating means of this invention is a means for determining, based on the information detected by the detecting means, whether the object is a person or not before the occurrence of a vehicle collision and has the same structure of the discriminating means described in the first form.

The protecting means of this invention is a means which is operative to reduce impact acting on the object in the event of a vehicle collision and has the same structure of the protecting means described in the sixth form.

The control means of this invention is a means for controlling the operation mode of the protecting means and is adapted such that when the discriminating means determines that the object is a person and when the running speed of the vehicle is in a predetermined reference range and the relative approach speed detected by the detecting means exceeds a predetermined threshold, the control means outputs an actuation signal to the protecting means. The running speed of the vehicle is detected by, for example, an existing speed detection sensor attached to the vehicle. The relative approach speed is defined as relative speed between the vehicle and the object when moving closer to each other. The thresholds (reference values) of the running speed and the relative approach speed are set according to results of previously conducted tests or analyses. For example, a combination of a running speed range and a relative speed range which has a high possibility of a vehicle collision and a combination of a running speed range and a relative speed range which has a low possibility of a vehicle collision are evaluated and the threshold range is set between these ranges. As an example, the threshold for the running speed of the vehicle may be set in a value or a range between 10 to 30 km/hr.

The protection system of the fourteenth form achieves a structure of outputting an actuation signal to the protecting means when the object is a person and the running speed of the vehicle and the relative approach speed exceed the predetermined threshold.

The fifteenth form of the present invention for achieving the aforementioned object is a protection system described hereinbelow. In the protection system of the fifteenth form, the detecting means as described in any one of the sixth through fourteenth forms may be a stereo camera sensor composed of a plurality of single camera sensors, for example, a stereo camera sensor as a combination of two single camera sensors which are attached to the left and right door mirrors of the vehicle, respectively.

The protection system of the fifteenth form enables detection of an object existing within a wider area by using a stereo camera sensor.

The sixteenth form of the present invention for achieving the aforementioned object is a vehicle described hereinbelow. The vehicle of the sixteenth form is a vehicle with a protection system as claimed in any one of the sixth through the fifteenth forms.

The vehicle of the sixteenth form enables reduction of the repair cost (maintenance cost) relating to the protection system after operation.

As described in the above, the present invention provides an effective technology for reducing repair cost for a vehicle by a system for detecting an object existing at the periphery of the vehicle which can detect information about shape of the object even without touching the object and thus discriminate whether the object is a person or not based on the detected information before the occurrence of a vehicle collision.

DETAILED DESCRIPTION OF THE PREFERRED EMBODIMENTS

Hereinafter, embodiments of the present invention will be described in detail with reference to drawings. First, description will be made as regard to a protection system 100 as an embodiment of the "protection system" according to the present invention with reference to FIG. 1 and FIG. 2. The protection system 100 of this embodiment is installed to a vehicle 10 (automobile) as the "vehicle" of the present invention and is adapted as a system which detects an object existing at the periphery of the vehicle 10 and acts according to the detected information. Examples of the "object" used here include a vehicle other than the subject vehicle such as a running vehicle, a vehicle at a stop, and a parked vehicle, a fixed object such as a telephone pole, a guardrail, a road sign, a house, a fence, and a falling object on a road, and a moving or not-moving vulnerable road user (referred to simply as "person") such as a pedestrian, a person on a bicycle, and a person on a wheelchair.

Figure 1:
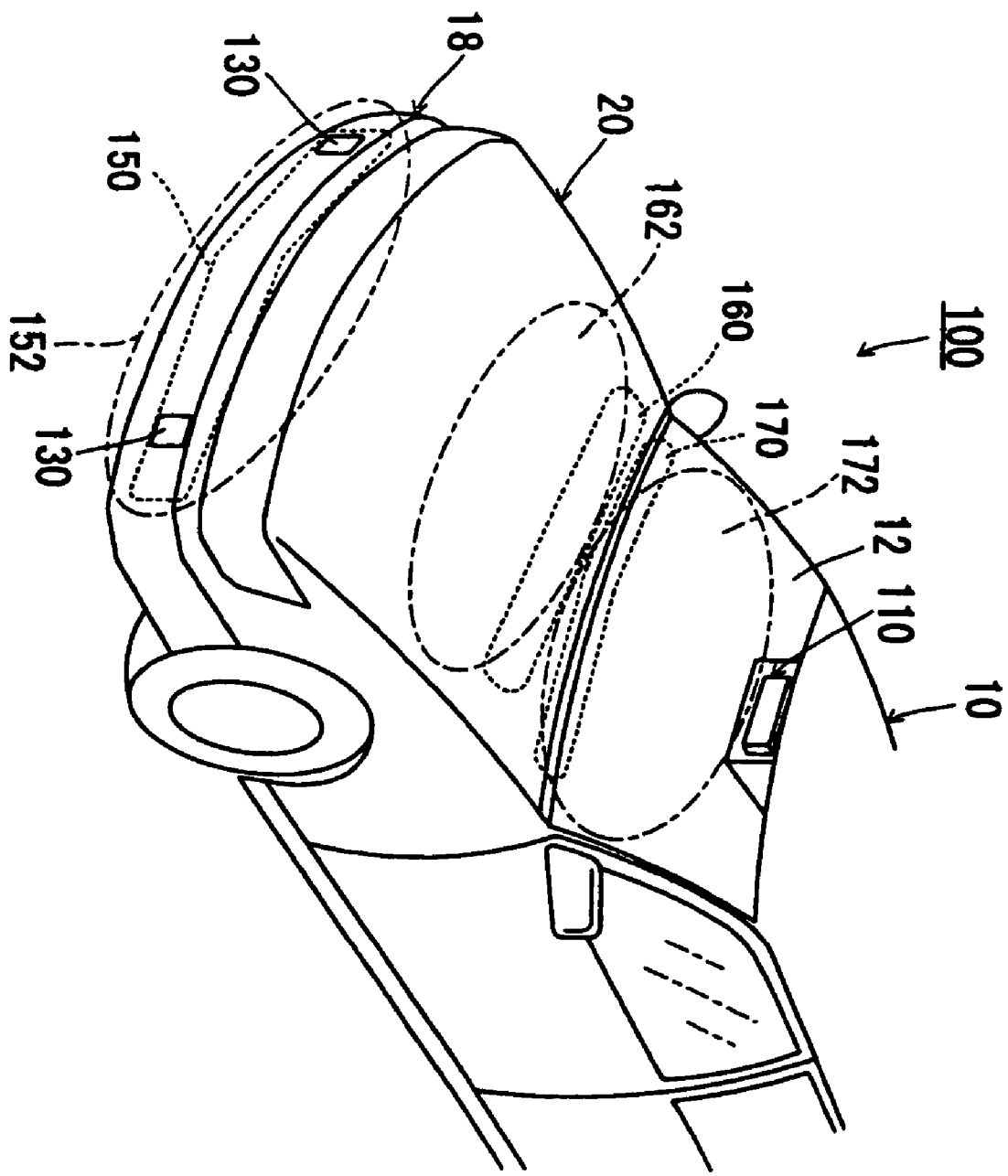
FIG. 1 is an illustration schematically showing the structure of a vehicle 10 with a protection system 100 of an embodiment according to the present invention.
Figure 2:
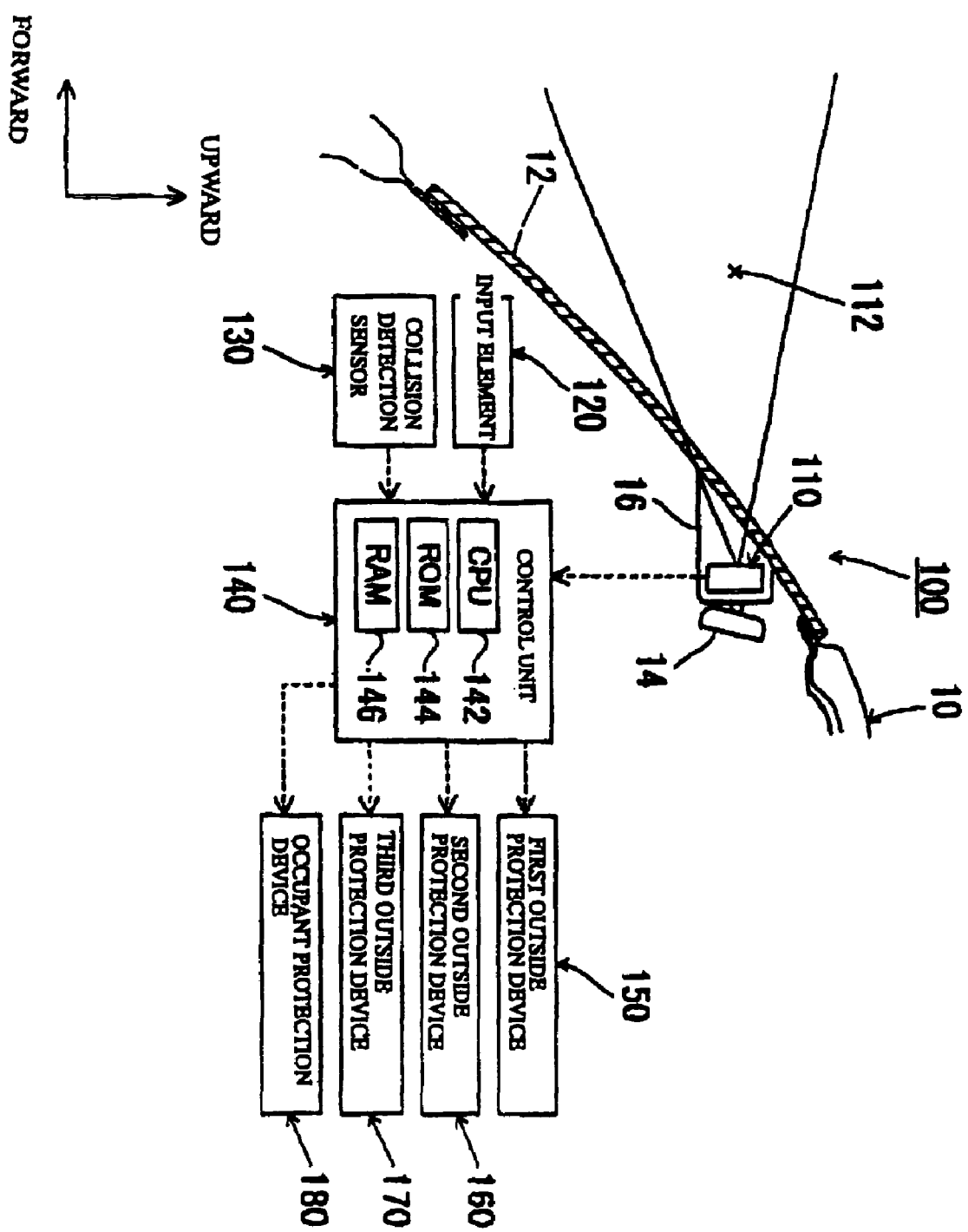
FIG. 2 is an illustration showing the system structure of the protection system 100 shown in FIG. 1.

FIG. 1 schematically shows the structure of a vehicle 10 with the protection system 100 of this embodiment according to the present invention and FIG. 2 shows the system structure of the protection system 100 shown in FIG. 1.

As shown in FIG. 1 and FIG. 2, the protection system 100 installed in the vehicle 10 comprises at least a camera sensor 110, an input element 120, collision detection sensors 130, a control unit 140, a first outside protection device 150, a second outside protection device 160, a third outside protection device 170, and an occupant protection device 180.

The camera sensor 110 is structured as a single camera sensor having a function of detecting an object existing at the periphery of the vehicle (for example, a detectable area 112) such as on the front of the vehicle 10 or on the side of the vehicle 10. The camera sensor 110 is a means for detecting the presence of and the shape of the object without touching the object and composes the "detecting means" of the present invention. In this embodiment, the camera sensor 110 is attached to a housing 16 disposed on the vehicle-inner side of a front windshield glass (windshield) 12. Also attached to the housing 16 is a rearview mirror 14. The camera sensor 110 may be a CCD camera or a C-MOS camera. Information detected by the camera sensor 110 is transmitted to the control unit 140 and is used for controlling the outside protection devices 150-170 and the occupant protection device 180.

Instead of the camera sensor 110, various conventionally known means capable of detecting an object such as a laser beam sensor, a millimeter wave sensor, a far-infrared camera, a near-infrared camera, a visible-light camera, a dynamic range camera for visible-light and infrared range, and an ultrasonic sensor may be suitably used.

The input element 120 is structured as an element having a function of detecting various information about the vehicle 10 as the subject vehicle and various information about an object constantly or at regular time intervals. Specifically, detected by the input element 120 may be the speed of the vehicle 10, the rate of change in speed per unit time, the relative speed between the vehicle 10 and the object, and the rate of change in relative speed per unit time, the relative position between the vehicle 10 and the object, and the like. Information detected by the input element 120 is transmitted to the control unit 140 and is used for controlling the outside protection devices 150-170 and the occupant protection device 180.

The collision detection sensors 130 are each structured as a sensor having a function of detecting the occurrence of a collision of the vehicle 10. The collision detection sensors 130 correspond to the "collision detecting means for detecting the occurrence of a collision between the vehicle and an object" of the present invention. In this embodiment, the collision detection sensors 130 are attached to left and right portions of a front end portion 18 of the vehicle 10. As the collision detection sensor 130, an acceleration-type crash sensor which detects the occurrence of a collision based on the acceleration in three axes (X-axis, Y-axis, Z-axis) acting on the vehicle 10 during the vehicle collision may be used. Instead of or in addition to the acceleration-type crash sensor, various conventionally known sensors capable of detecting the occurrence of a collision such as an optical-cable-type crash sensor, a crash sensor of a type which detects structural displacement of the vehicle, a crash sensor of a type which detects rate of structural displacement of the vehicle, an electrode-switch-type crash sensor, a crash sensor of a type which detects change of magnetic field, and a crash sensor of a type which detects change of bladder inner pressure may be suitably used.

The control unit 140 comprises a CPU (central processing unit) 142, a ROM 144, a RAM 146, an input/output device, and a peripheral device (not shown) which are of type conventionally known. The control unit 140 has a function of conducting calculation process, discrimination process, prediction process, and storage process according to information at least from the input element 120 and the collision detection sensors 130 and also has a function of outputting control signals at least to the outside protection devices 150-170 (corresponding to the "protecting means" of the present invention) and the occupant protection device 180. The control unit 140 compose the "discriminating means", the "control means", and the "collision predicting means" of the present invention. Therefore, the combination of the camera sensor 110 as the detecting means and the control unit 140 as the discriminating means composes the "object detection system" of the present invention.

The control unit 140 may be a common control means for general control of the vehicle 10 or a control means exclusively for the protection system 100.

The first outside protection device 150 is a device for protecting a vulnerable road user by reducing the impact acting on the vulnerable road user at the event of a vehicle collision within a protective area (the first protective area 152 shown in FIG. 1) about the front end portion 18 (including a front bumper and a bumper reinforcement) of the vehicle 10. Among the protective areas which are defined from the front end portion 18 to the front windshield glass 12 of the vehicle 10, the first protective area 152 is located at the front-most position and at a relatively lower height from the road surface. The first outside protection device 150 of this embodiment is an airbag-type protection device embedded in the front end portion 18 of the vehicle 10 and has a structure comprising an airbag which can be inflated and deployed with gas supplied from an inflator to directly receive a vulnerable road user at the first protective area 152 so as to reduce the impact on the vulnerable road user, but not especially illustrated. As an alternative structure, the first outside protection device 150 may have a structure in which the front end portion itself of the vehicle 10 or a buffering member (pad member) having a rectangular shape or a plate-like shape disposed at the front end portion projects toward the vehicle front or a portion above the vehicle by a driving means such as a driving arm or an airbag.

The first outside protection device 150 corresponds to "a first protecting means which is capable of working on a protective area at the front end of the vehicle" of the present invention.

The second outside protection device 160 is a device for protecting a vulnerable road user by reducing the impact acting on the vulnerable road user at the event of a vehicle collision within a protective area (the second protective area 162 shown in FIG. 1) on a hood 20 of the vehicle 10. Among the protective areas which are defined from the front end portion 18 to the front windshield glass 12 of the vehicle 10, the second protective area 162 is located at a middle portion and at a relatively medium height from the road surface. The second outside protection device 160 of this embodiment is an airbag-type protection device embedded in a portion under the hood 20 of the vehicle 10 and has a structure comprising an airbag which can be inflated and deployed with gas supplied from an inflator to directly receive a vulnerable road user at the second protective area 162 so as to reduce the impact on the vulnerable road user, but not especially illustrated. As an alternative structure, the second outside protection device 160 may have a structure in which the hood 20 itself flaps up by a driving means such as a driving arm or an airbag.

The second outside protection device 160 corresponds to "a second protecting means which is capable of working on a protective area on the hood of the vehicle" of the present invention.

The third outside protection device 170 is a device for protecting a vulnerable road user by reducing the impact acting on the vulnerable road user at the event of a vehicle collision within a protective area (the third protective area 172 shown in FIG. 1) on the front windshield glass 12 of the vehicle 10. Among the protective areas which are defined from the front end portion 18 to the front windshield glass 12 of the vehicle 10, the third protective area 172 is located at the rear-most position and at a relatively higher height from the road surface. The third outside protection device 170 of this embodiment is an airbag-type protection device embedded in a portion under a boundary between the front windshield glass 12 and the hood 20 of the vehicle 10 and has a structure comprising an airbag which can be inflated and deployed with gas supplied from an inflator to directly receive a vulnerable road user at the third protective area 172 so as to reduce the impact on the vulnerable road user, but not especially illustrated. As an alternative structure, the third outside protection device 170 may have a structure in which a buffering member (pad member) having a rectangular shape or a plate-like shape flaps up toward an upper portion of the front windshield glass 12 by a driving means such as a driving arm or an airbag.

The third outside protection device 170 corresponds to "a third protecting means which is capable of working on a protective area on the front windshield of the vehicle" of the present invention.

The occupant protection device 180 is a device having a function of protecting a vehicle occupant at the event of a vehicle collision and is composed of one of various airbags embedded in a steering wheel in front of a driver seat, a dashboard in front of a front passenger seat, a door trim, a seat, a pillar, and the like or a pretensioner for applying a preset tension on a seat belt, but not especially illustrated.

Hereinafter, the action of the protection system 100 having the aforementioned structure will be described with reference to FIG. 3 through FIG. 10.

Figure 3:
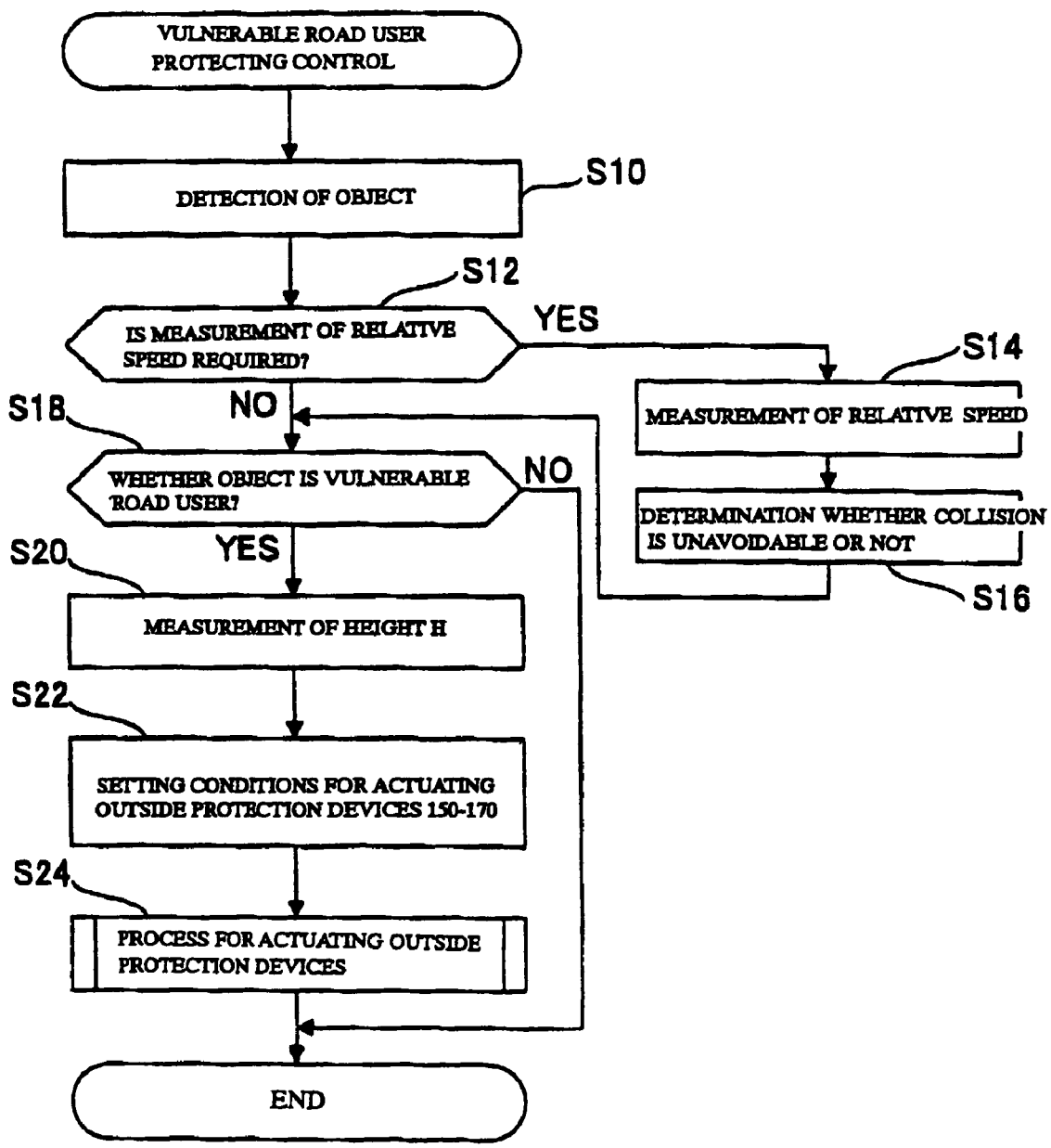
FIG. 3 is a flow chart of a vulnerable road user protection control according to the action of the protection system 100 shown in FIG. 2.

FIG. 3 shows a flow chart of a vulnerable road user protection control according to the action of the protection system 100 shown in FIG. 2. The "vulnerable road user protection control" of this embodiment is carried out by the control unit 140 having the aforementioned structure.

In the vulnerable road user protection control shown in FIG. 3, the camera sensor 110 detects an object in a step S10. In this regard, the camera sensor 110 detects the presence of and the shape of the object. When the relative speed between the object detected by the camera sensor 110 and the vehicle 10 (the subject vehicle) is required to be measured (YES of the step S12), the control proceeds to a step S14. When the relative speed is not required to be measured (NO of the step S12), the control proceeds to a step S18.

After the relative speed between the object and the vehicle 10 (the subject vehicle) is measured in the step S14, it is determined whether collision between the object and the vehicle 10 is unavoidable or not in a step S16. After the result of the determination is stored, the control proceeds to a step S18. In the step S16, the determination whether collision is unavoidable or not is conducted using data about the running speed of the vehicle 10 and data about the relative position between the object and the vehicle 10 in addition to the relative speed measured in the step S14 so that the data can be selectively used in any combination according to need.

As an example, when the relative approach speed between the vehicle 10 and the object moving closer to each other or a combination of the relative approach speed and the running speed of the vehicle 10 exceeds a threshold (reference value) which was preset according to results of previously conducted tests or analyses, it is determined that a collision is unavoidable. The threshold for the running speed of the vehicle 10 may be, for example, a value or a range between 10 to 30 km/hr. Alternatively, when the relative position between the object and the vehicle 10 is less than a threshold (reference value) which was preset according to results of previously conducted tests or analyses, it is determined that collision is unavoidable. When it is determined, based on information such as information about the relative approach speed and the like, that collision is nearly unavoidable, a control signal for collision avoidance process may be outputted to a driving system of the vehicle. As a result, when the collision is nearly unavoidable, it is determined that collision is unavoidable. On the other hand, when collision may be avoided, it is determined that collision is not unavoidable.

In this embodiment, the processes in the step S14 and the step S16 can be eliminated according to need.

In a step S18, based on information about shape of the object detected by the camera sensor 110, it is discriminated whether the object is a vulnerable road user (person) or not before the vehicle collision. When the object detected by the camera sensor 110 is a vulnerable road user (YES in the step S18), the control proceeds to a step S20. When the object is not a vulnerable road user (NO in the step S18), the vulnerable road user protection control is terminated.

In the step S20, the height (body length) H of the vulnerable road user detected is measured. From this measured data, the body length (body size) of the vulnerable road user is obtained so that it is discriminated whether the vulnerable road user is a large adult, a small adult, or a child. That is, in this embodiment, when it is determined that the object is a vulnerable road user, the body size of the vulnerable road user is also discriminated before the occurrence of a collision. After that, in a step S22, the setting of conditions for actuating the outside protection devices 150-170 is conducted. The actuating conditions are set based on the data about relative speed if measured in addition to the data about measured height H of the vulnerable road user.

As data to be obtained for discriminating the body size of the vulnerable road user in the step S20, one or more of data such as the height (body length), the width (the chest width, the shoulder width, or the like), the projected area, and the volume of the vulnerable road user may be suitably selected.

As a result, in the step S22, the modes of actuation signals to be outputted from the control unit 140 to the outside protection devices 150-170, for example, selection of inflator(s) among inflators composing the outside protection devices 150-170, the timing of outputting the actuation signals, the order of outputting the actuation signals, are set. Specifically, as the vulnerable road user is discriminated in the step S20, it can be determined which device among the outside protection devices 150-170 is required to be used to conduct protection at the corresponding area among the protective areas which are defined from the front end portion 18 to the front windshield glass 12 of the vehicle 10.

In a process for actuating the outside protection devices by a step S24, the outside protection devices 150-170 are controlled according to the result of determination whether collision is unavoidable or not conducted in the step S16 and the actuation conditions set in the step S22. For example, when it is determined that the collision is unavoidable in the step S16, the actuation conditions, that is, which device among the outside protection devices 150-170 is selected and how and when the actuation signal (control signal) is outputted to the selected device, are determined according to the actuation conditions set in the step S22. By the actuation signals outputted according to the actuation conditions, the respective outside protection devices are actuated. Specific operation modes of the respective outside protection devices will be described later with reference to FIG. 4 through FIG. 9.

Instead of the aforementioned structure, another structure may be employed in which it is determined that the object is a vulnerable road user in the step S18 after it is determined that collision is unavoidable in the step S16, the control proceeds directly to the step S22 and the step S24 without the step S20 to output actuation signals (control signals) to the outside protection devices 150-170. That is, when it is determined that the object is a vulnerable road user, the outside protection devices 150-170 are directly controlled without discriminating the body size of the vulnerable road user.

Figure 4:
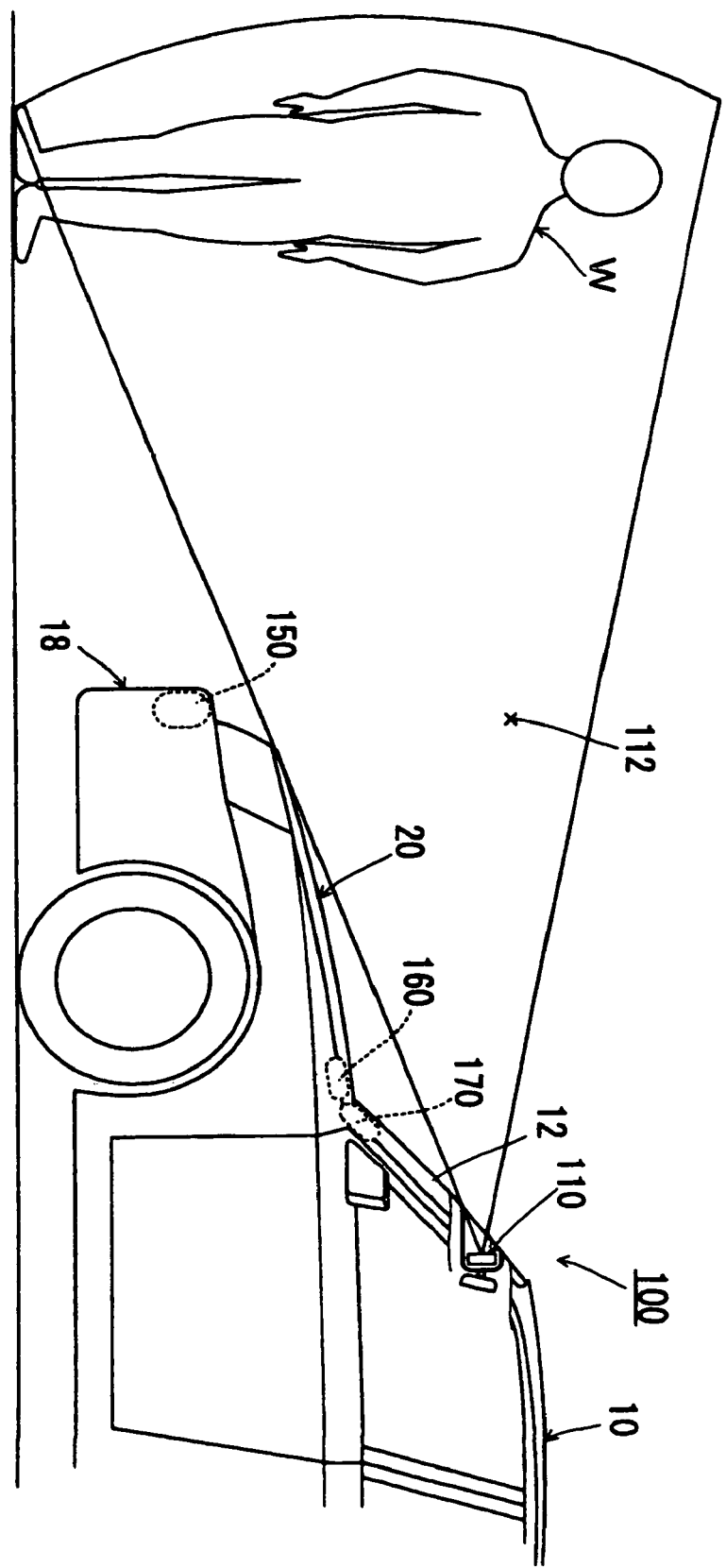
FIG. 4 is an illustration for explaining the action of the protection system 100 when the vulnerable road user W is a large adult.
Figure 5:
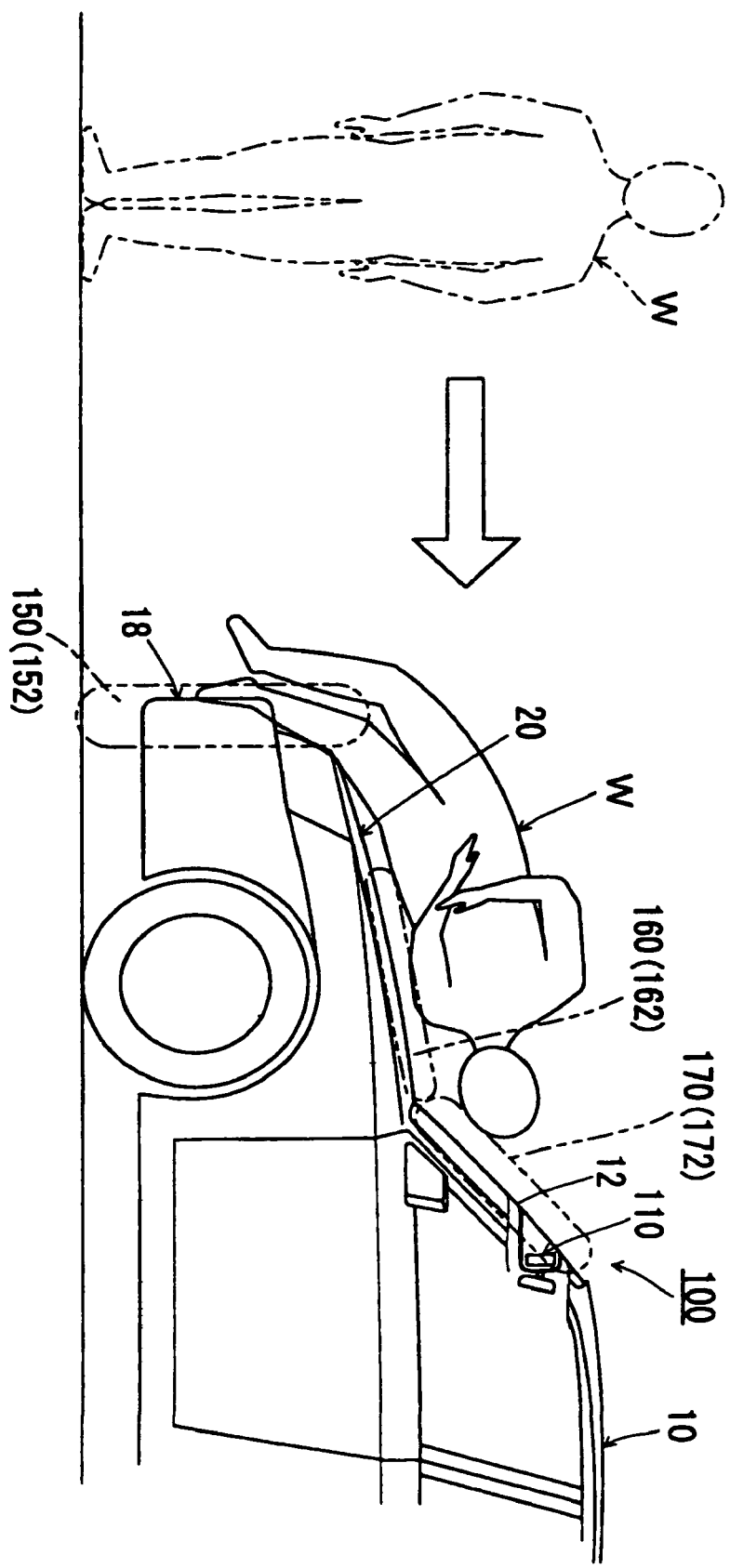
FIG. 5 is an illustration for explaining the action of the protection system 100 when the vulnerable road user W is the large adult.
Figure 6:
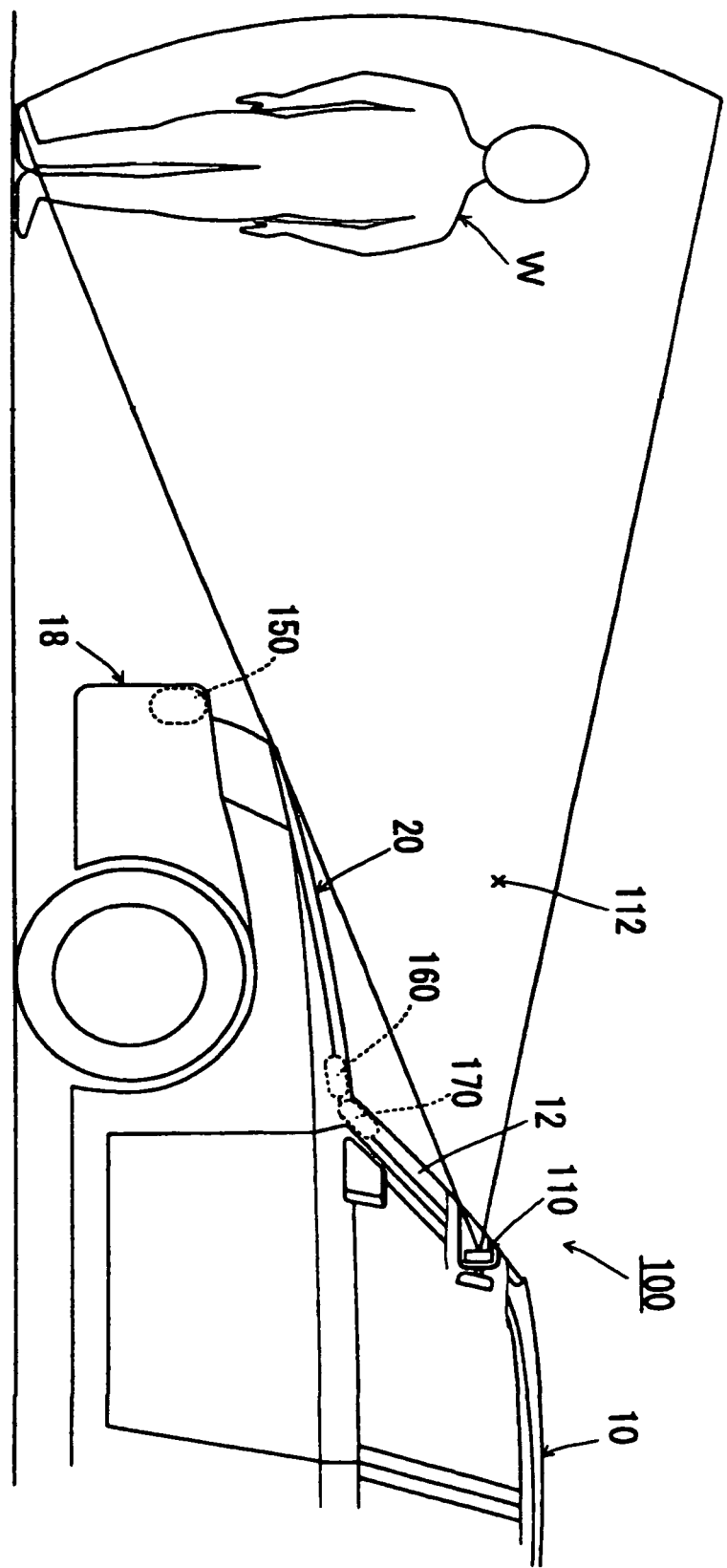
FIG. 6 is an illustration for explaining the action of the protection system 100 when the vulnerable road user W is a small adult.
Figure 7:
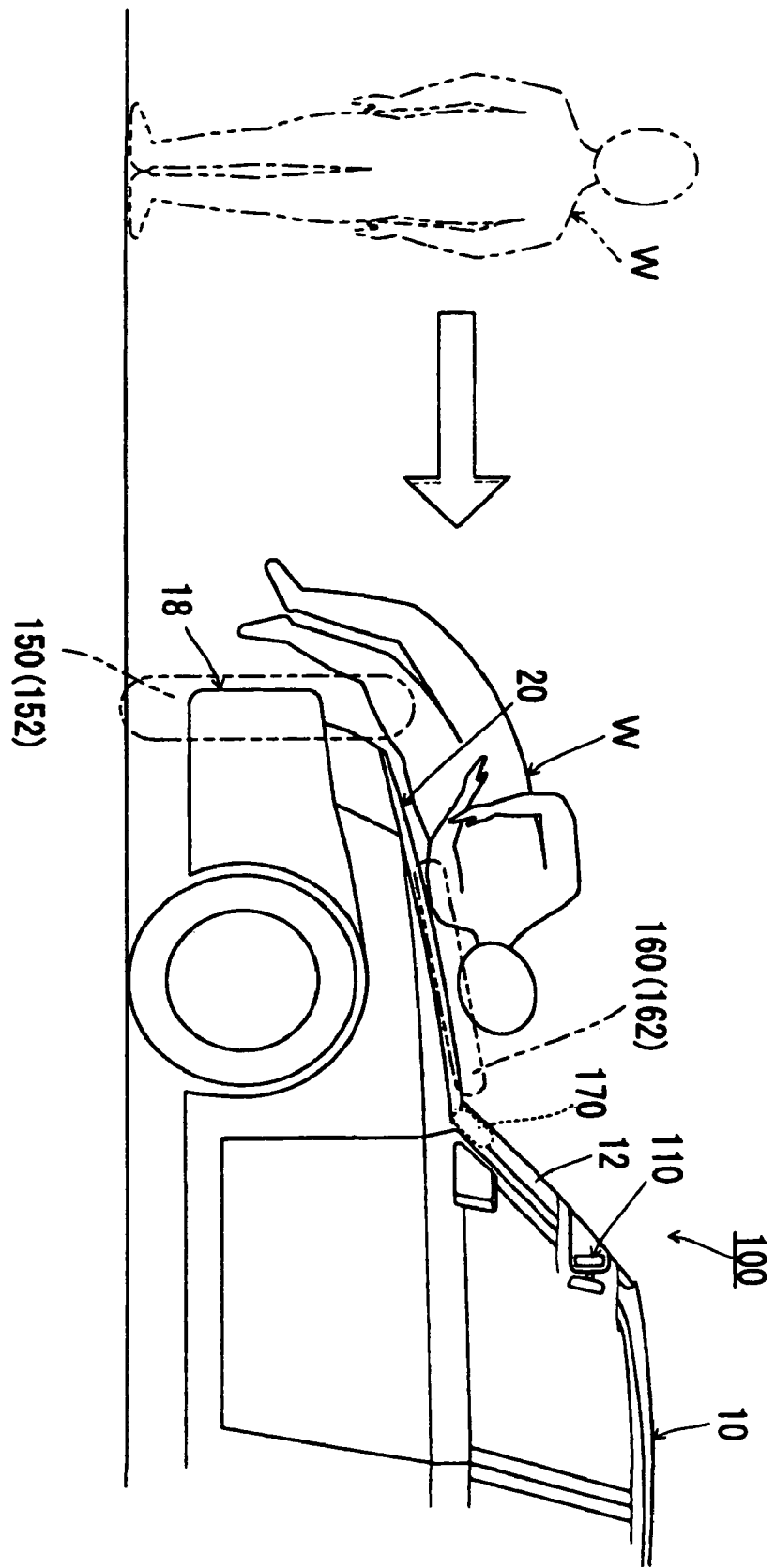
FIG. 7 is an illustration for explaining the action of the protection system 100 when the vulnerable road user W is the small adult.
Figure 8:
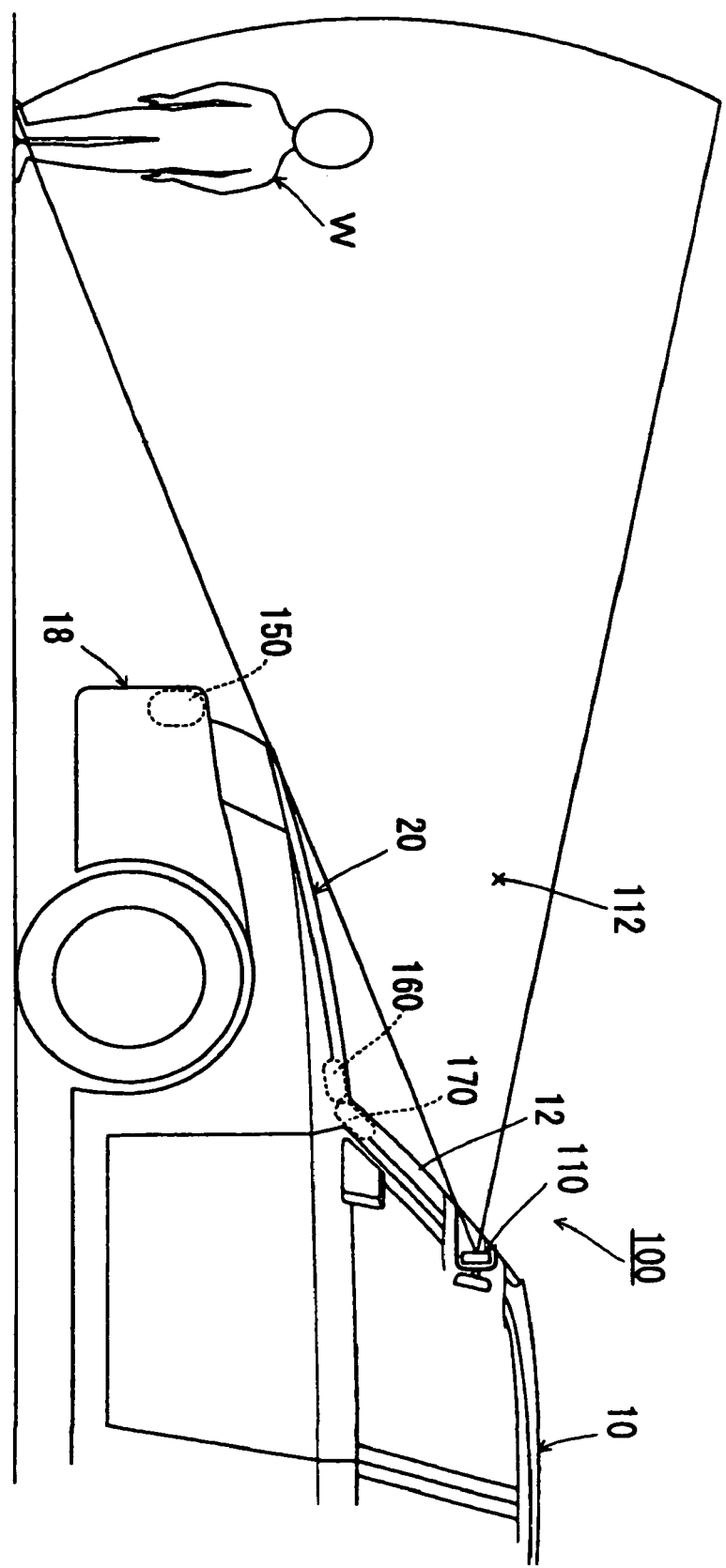
FIG. 8 is an illustration for explaining the action of the protection system 100 when the vulnerable road user W is a child.
Figure 9:
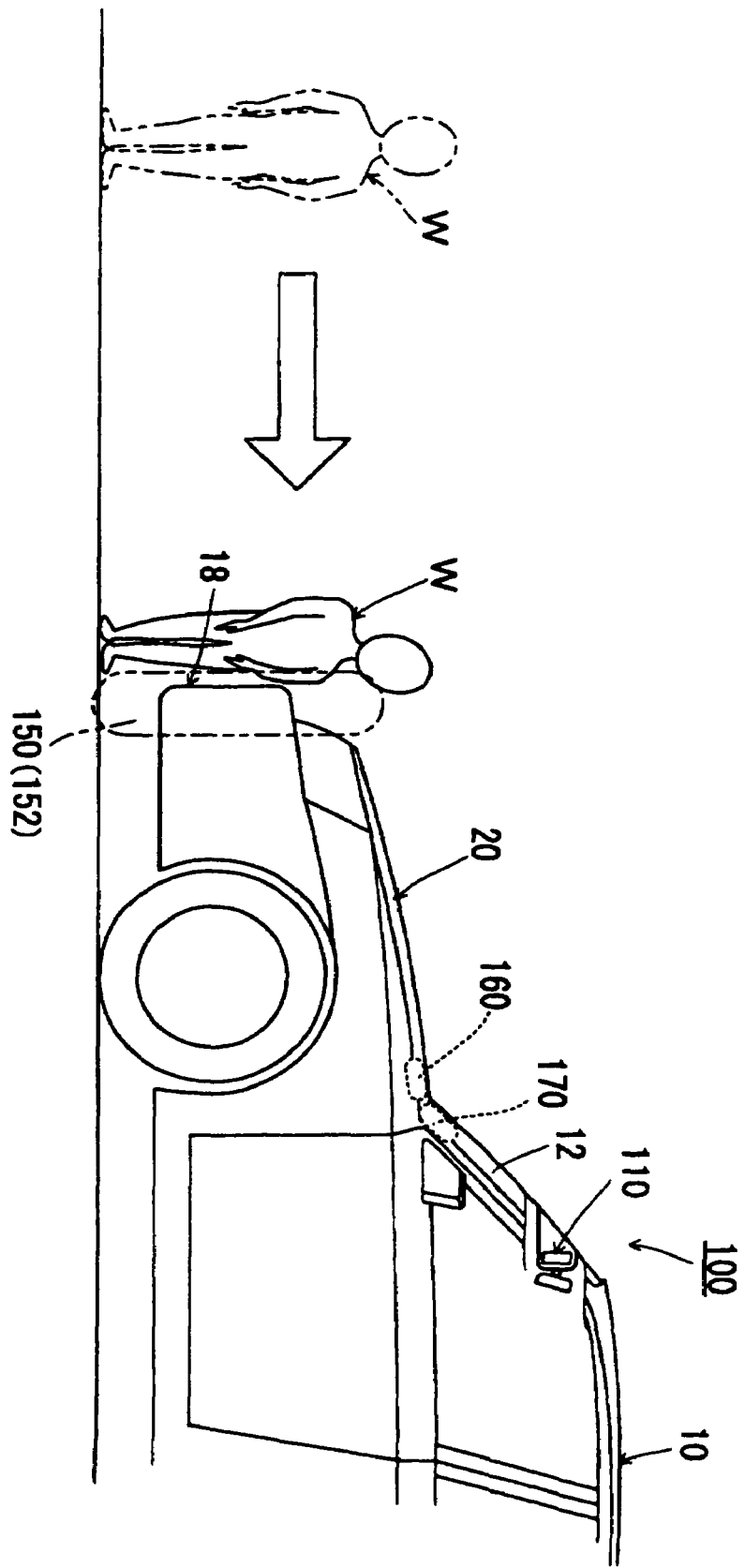
FIG. 9 is an illustration for explaining the action of the protection system 100 when the vulnerable road user W is the child.

FIGS. 4-9 show specific examples of action of the protection system 100 corresponding to the step S20 through the step S24 of the aforementioned vulnerable road user protection control. FIG. 4 and FIG. 5 are illustrations for explaining a case that the vulnerable road user W is a large adult, FIG. 6 and FIG. 7 are illustrations for explaining a case that the vulnerable road user W is a small adult, and FIG. 8 and FIG. 9 are illustrations for explaining a case that the vulnerable road user is a child.

As shown in FIG. 4, when the camera sensor 110 detects an object in front of the vehicle 10 and measures the height H of the object and, as a result, the height H exceeds an upper reference value Ha previously set, it is determined that the vulnerable road user W illustrated is a large adult (or a tall person). It is envisioned that the vulnerable road user W will lie over substantially entirely the protective areas (first protective area 152 through the third protective area 172) which are defined from the front end portion 18 to the front windshield glass 12 of the vehicle 10 in the event of collision as shown in FIG. 5. Therefore, in this embodiment, the outside protection devices 150-170 covering all of the first protective area 152 through the third protective area 172 are all controlled to be actuated in the aforementioned process for actuating the outside protection devices by the step S24. In this regard, the actuation signals to the outside protection devices 150-170 may be outputted simultaneously at a predetermined timing and may be outputted with some time lag. Accordingly, the vulnerable road user W who is a large adult (or a tall person) is protected at his or her legs by the first outside protection device 150, at his or her chest and abdomen by the second outside protection device 160, and at his or her head by the third outside protection device 170.

As shown in FIG. 6, when the camera sensor 110 detects an object in front of the vehicle 10 and measures the height H of the object and, as a result, the height H is between the upper reference value Ha and a lower reference value Hb previously set, it is determined that the vulnerable road user W illustrated is a small adult (or a medium-height person). It is envisioned that the vulnerable road user W will lie over the first protective area 152 and the second protective area 162 among the protective areas which are defined from the front end portion 18 to the front windshield glass 12 of the vehicle 10 in the event of collision as shown in FIG. 7. Therefore, in this embodiment, the first outside protection device 150 covering the first protective area and the second outside protection device 160 covering the second protective area 162 are controlled to be actuated in the aforementioned process for actuating the outside protection devices by the step S24. In this regard, the actuation signals to the outside protection devices 150 and 160 may be outputted simultaneously at a predetermined timing and may be outputted with some time lag. Accordingly, the vulnerable road user W who is a small adult (or a medium-height person) is protected at his or her legs by the first outside protection device 150 and at his or her chest, abdomen, and head by the second outside protection device 160.

As described in the above, this embodiment employs such a structure that actuation signals are outputted to the outside protection devices 150-170 (protecting means) only when the object is a vulnerable road user (person) and, in addition, the number and combination of the outside protection devices 150-170 to be actuated can be varied according to the body size of the vulnerable road user. Instead of this structure, a structure that the number and combination of the outside protection devices 150-170 to be actuated can be varied according to the relative speed between the vehicle 10 and the object (the vulnerable road user) may be employed.

As shown in FIG. 8, when the camera sensor 110 detects an object in front of the vehicle 10 and measures the height H of the object and, as a result, the height H is below the lower reference value Hb previously set, it is determined that the vulnerable road user W illustrated is a child (or a short person). It is envisioned that the vulnerable road user W will lie over the first protective area 152 among the protective areas which are defined from the front end portion 18 to the front windshield glass 12 of the vehicle 10 in the event of collision as shown in FIG. 9. Therefore, in this embodiment, the first outside protection device 150 covering the first protective area 152 is controlled to be actuated in the aforementioned process for actuating the outside protection devices by the step S24. Accordingly, the vulnerable road user W who is a child (or a short person) is protected entirely, i.e. at his or her legs, chest, abdomen, and head by the first outside protection device 150.

Particularly in this embodiment, the lower limit of the first protective area 152 by the first outside protection device 150 is set to be a ground and the first outside protection device 150 is structured to have an airbag or a pad member to be inflated and deployed about this area so that the lower end portion of the airbag or pad member extends to the ground. This structure can prevent the occurrence of phenomenon that the vulnerable road user W enters underneath the vehicle 10, that is, the occurrence of "engulfment phenomenon".

When it is determined, based on information detected by the collision detection sensor(s) 130, that a vehicle collision occurs, an actuation control signal is outputted to the occupant protection device 180. The airbag composing the occupant protection device 180 is inflated and deployed into an occupant protective area, thereby achieving the occupant protection.

Figure 10:
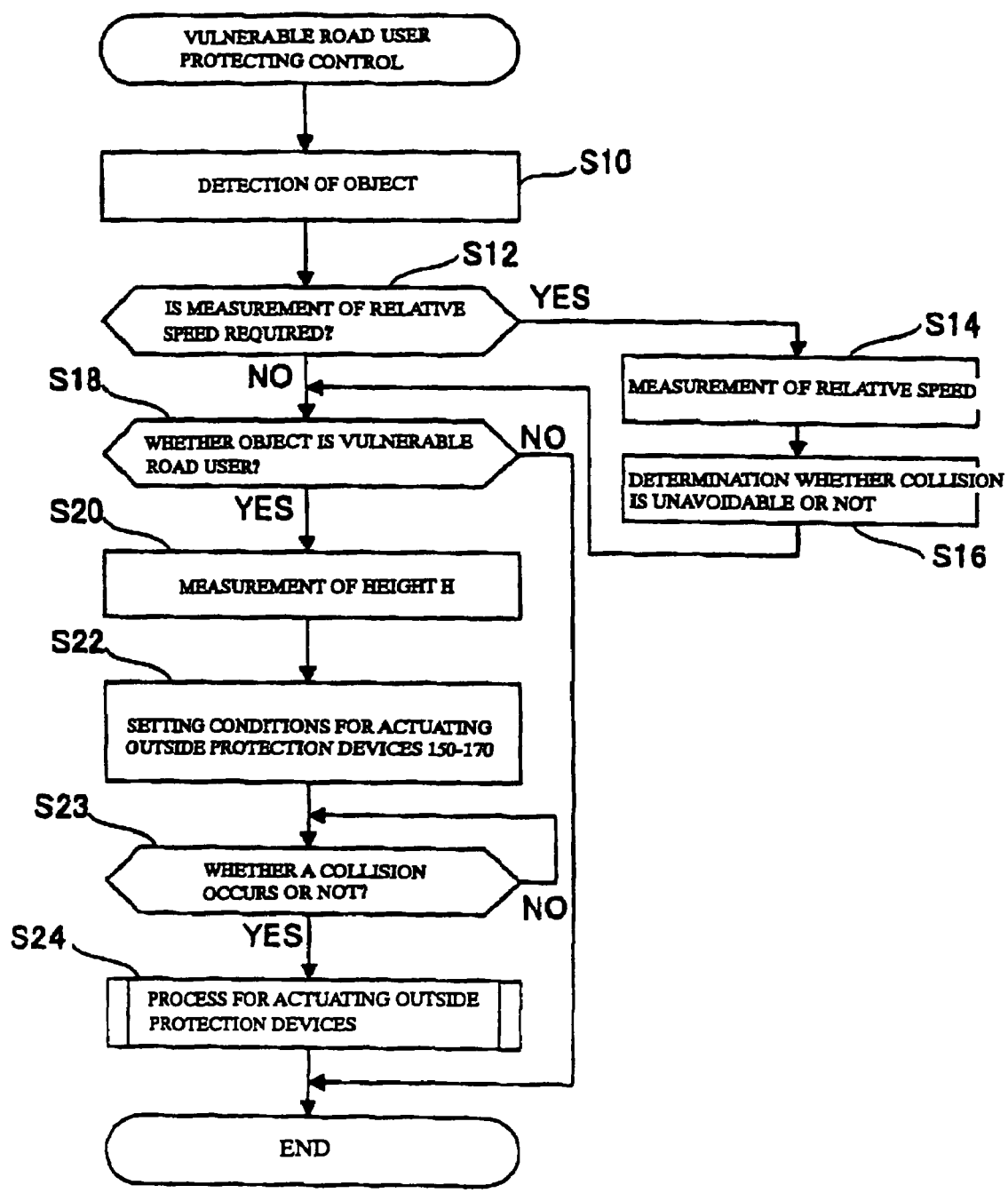
FIG. 10 is a flow chart of a vulnerable road user protection control of another embodiment.

As an alternative embodiment of the vulnerable road user protection control as shown in FIG. 3, a vulnerable road user protection control represented by a flow chart of FIG. 10 may be employed.

In the vulnerable road user protection control shown in FIG. 3, the process for actuating the outside protection devices by the step S24 is performed regardless of whether the vehicle collision actually occurs or not. However, in the vulnerable road user protection control shown in FIG. 10, the process for actuating the outside protection devices by the step S24 is performed under conditions that the vehicle collision actually occurs. That is, in the vulnerable road protection control shown in FIG. 10, a step S23 is performed between the step S22 and the step S24 of the vulnerable road user protection control shown in FIG. 3. When it is determined, based on the information detected by the collision detection sensor(s) 130, that the vehicle collision occurs (YES in the step S23), the process for actuating the outside protection devices by the step S24 is performed.

Instead of the structure mentioned above, such a structure that when it is determined that the object is a vulnerable road user in the step S18 after it is determined that vehicle collision is unavoidable in the step S116, the control proceeds directly to the step S22 through the step S24 without performance of the step S20 so as to output control signals to the outside protection devices 150-170 under conditions that the vehicle collision occurs. That is, when it is determined that the object is a vulnerable road user, detection of the occurrence of a vehicle collision and control of the outside protection devices 150-170 are performed directly without discriminating the body size of the vulnerable road user.

According to the vehicle 10, the protection system 100, and the object detection system of this embodiment as mentioned above, actuation signals are outputted to the outside protection devices 150-170 (protecting means) only when the object is a vulnerable road user (person), thereby preventing the outside protection devices 150-170 from being actuated when the object is a vehicle or a fixed object not a vulnerable road user. Therefore, the outside protection devices 150-170 are prevented from being wastefully actuated, thus reducing the repair cost (maintenance cost) relating to the outside protection devices 150-170 after operation. Particularly in this embodiment, the number and combination of the outside protection devices 150-170 to be actuated can be varied according to the body size of the vulnerable road user, thereby further improving the effect of reducing the repair cost (maintenance cost) relating to the outside protection devices 150-170 after operation.

This embodiment employs the outside protection devices 150-170 capable of working on the protective areas which are defined from the front end portion 18 to the front windshield glass 12 of the vehicle 10, thereby enabling intensive protection of a person outside of the vehicle. Particularly, the structure of varying the number and combination of the outside protection devices 150-170 to be actuated according to the body size of the vulnerable road user is employed, thereby enabling the optimization of protection of the vulnerable road user.

The present invention is not limited to the aforementioned embodiments and various applications and modifications may be made. For example, the following respective embodiments based on the aforementioned embodiment may be carried out.

Figure 11:
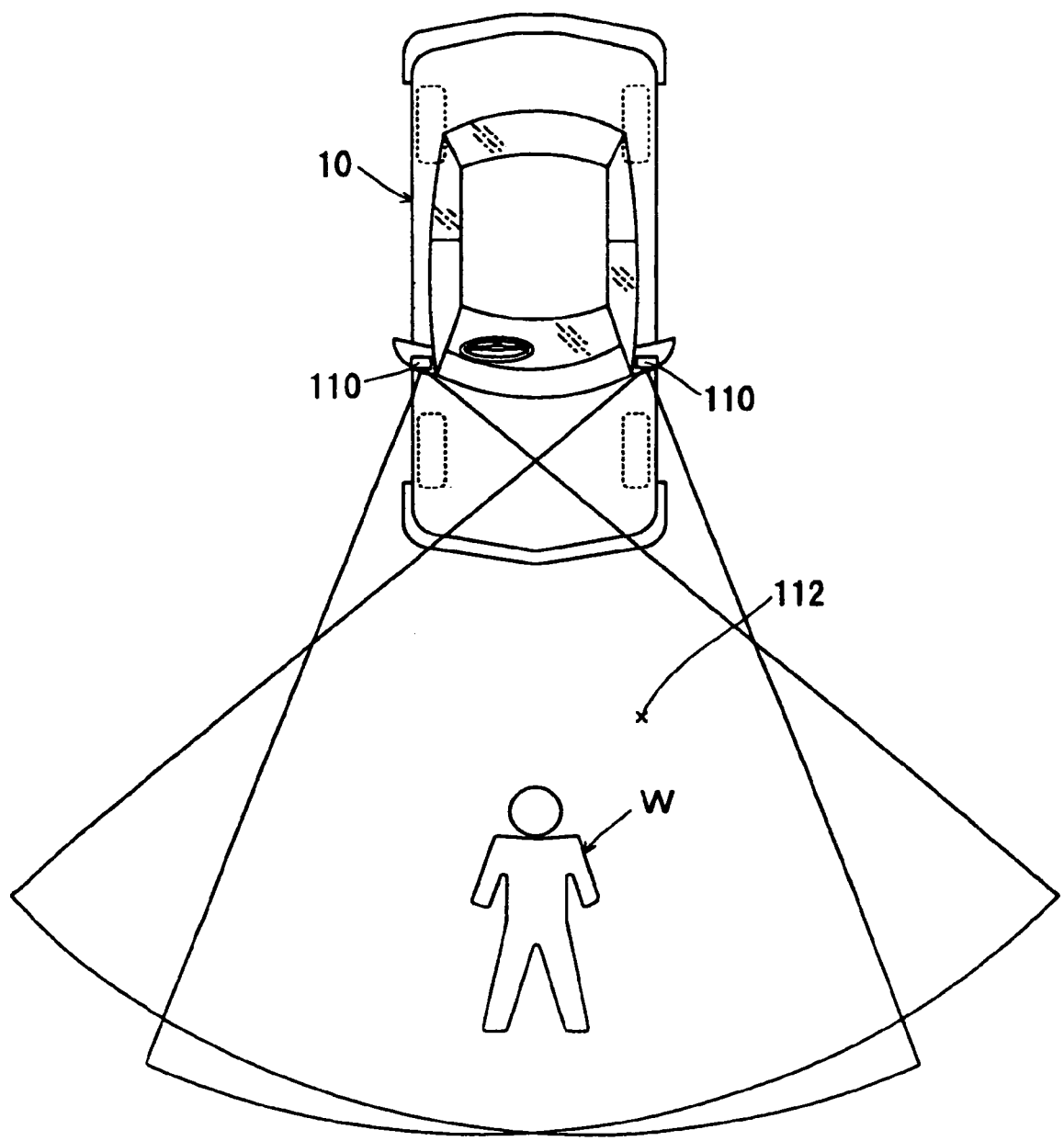
FIG. 11 is an illustration showing another embodiment relating to the arrangement of camera sensors 110.

Though the aforementioned embodiment has been described with regard to a case where the camera sensor arrangement composed of a single camera sensor 110 is employed as the structure for detecting an object existing at the periphery of a vehicle, the number of detecting means such as the camera sensor 110 is not limited and may be changed if necessary. For example, the camera sensor arrangement may be a stereo camera sensor (corresponding to the "stereo camera sensor" of the present invention) as a combination of two camera sensors 110 each of which is attached to each of the left and right door mirrors of the vehicle 10 as shown in FIG. 11. By employing this arrangement, the detectable area 112 is expanded, thereby enabling the detection of an object (for example, a vulnerable road user W in FIG. 11) existing at the periphery including a wider area.

Though the aforementioned embodiment has been described with regard to a case where the second outside protection device 160 and the third outside protection device 170 are separately provided, the present invention may employ a single outside protection device in which these outside protection devices are united. In this structure, for example, the single outside protection device may employ a single airbag which can be inflated and deployed to cover the second protection area 162 and the third protection area 172.

Though the aforementioned embodiment has been described with regard to a case where three protecting means, i.e. the outside protection devices 150-170, share the coverage of the protection areas which are defined from the front end portion 18 to the front windshield glass 12 of the vehicle 10, the number of the protecting means provided for the protective areas can be suitably changed according to need in the present invention.

Though the aforementioned embodiment has been described with regard to a case where the number and combination of the outside protection devices 150-170 to be actuated can be varied according to the body size of the vulnerable road user, the present invention may employ such a structure that the inflation pressure and/or the inflation speed of airbags composing the outside protection devices 150-170 can be varied according to the body size of the vulnerable road user.

Though the aforementioned embodiment has been described with regard to a case where information that the object is a vulnerable road user is used for controlling the outside protection devices 150-170, the information that the object is a vulnerable road user may be used for controlling target devices other than the outside protection devices 150-170.

Though the aforementioned embodiment has been described with regard to the structure of the object detection system and the protection system to be installed in an automobile, the present invention can be adopted to various vehicles other than automobile such as a bus, a train, and a boat.

What is claimed is:

1. A combination comprising:
   a detecting device mounted to a vehicle configured to detect information regarding a shape of an object about a periphery of the vehicle without engagement therewith;
   a discriminating device configured to determine if the object is a person based on the detected information regarding the object shape;
   a protecting device operable to reduce impact forces acting on the object in the event of a vehicle collision therewith; and
   a control device configured to be operable to actuate the protecting device when the discriminating device determines that the object is a person,
   wherein the discriminating device is configured so that if the object is determined to be a person, the discriminating device determines a body size of the person based on the detected information, the protecting device includes different operating modes, the control device is configured to actuate the protecting device in one of the operating modes based on the person's body size, and the protecting device comprises a first protecting device at a front end of the vehicle, a second protective device at a hood of the vehicle, and a third protective device at a front windshield of the vehicle, and the control device actuates one or more of the protecting devices based on the person's body size.

2. A pedestrian protection system for a vehicle, the pedestrian protection system comprising:
   a sensor that detects information regarding size of a pedestrian prior to a vehicle collision with the pedestrian;
   a plurality of external pedestrian protection devices for being deployed at different areas about the vehicle including a hood airbag and a front windshield airbag; and
   a controller that is configured to determine and actuate the optimum protection device or protection devices to be deployed based on the detected information for minimizing vehicle impact forces with the pedestrian with the controller actuating both the hood and front windshield airbags for larger size pedestrians, and for smaller size pedestrians the controller actuates the hood airbag but not the front windshield airbag.

3. The pedestrian protection system of claim 2 including an input element configured to detect at least one of relative speed and relative position between the vehicle and the pedestrian without engagement therebetween, and the controller is configured to predict a collision between the vehicle and the pedestrian based on the at least one of the detected relative speed and the detected relative position with the controller operable to actuate the device or devices if a vehicle collision with the pedestrian is predicted.

4. The pedestrian protection system of claim 3 including a sensor that detects a vehicle collision with the controller operable to actuate the device or devices if the vehicle collision occurs.

5. A pedestrian protection system for a vehicle, the pedestrian protection system comprising:
   a sensor that detects information regarding a predetermined dimension of a pedestrian prior to a vehicle collision with the pedestrian;
   a plurality of external pedestrian protection devices for being deployed at different areas about the vehicle; and
   a controller that is configured to determine and actuate the optimum protection device or combination of protection devices to be deployed based on the detected information for minimizing vehicle impact forces with the pedestrian,
   wherein the predetermined dimension comprises height of the pedestrian, the controller determines whether the pedestrian is a tall, medium-height, or short person, and the protection devices comprise a front end external air bag, a hood air bag, and a front windshield air bag such that the controller actuates all three air bags if the pedestrian is tall, the front-end and hood air bags if the pedestrian is of medium height, and the front-end air bag if the pedestrian is short.

6. A method of controlling operation of protection devices of a vehicle for pedestrian protection, the method comprising:
   detecting presence of an object spaced from the periphery of the vehicle;
   determining if any present object is a pedestrian;
   determining a physical characteristic of any present pedestrian prior to vehicle engagement therewith;
   predicting whether the vehicle will collide with the pedestrian based on predetermined detected information regarding operation of the vehicle and the pedestrian; and
   deploying a either a hood airbag or both the hood airbag and a front windshield airbag based on the pedestrian's physical characteristic if a collision is predicted with the pedestrian.

7. The method of claim 6 including detecting a vehicle collision with a pedestrian and only deploying the the hood airbag or both the hood and front windshield airbags if both a collision is predicted and a collision is detected.

8. A method of controlling operation of protection devices of a vehicle for pedestrian protection, the method comprising:
   detecting presence of an object spaced from the periphery of the vehicle;
   determining if any present object is a pedestrian;
   determining a physical characteristic of any present pedestrian prior to vehicle engagement therewith;
   predicting whether the vehicle will collide with the pedestrian based on predetermined detected information regarding operation of the vehicle and the pedestrian; and
   deploying a predetermined protection device or devices based on the pedestrian's physical characteristic if a collision is predicted,
   wherein the physical characteristic is the pedestrian's height, and determining whether the pedestrian is tall, of medium-height, or short and deploying protective devices at the front-end, hood and windshield of the vehicle if the pedestrian is tall, protection devices at the front-end and hood if the pedestrian is of medium height, and a protection device at the front-end if the pedestrian is short.

* * * * *

UNITED STATES PATENT AND TRADEMARK OFFICE
CERTIFICATE OF CORRECTION

PATENT NO. : 7,543,677 B2  Page 1 of 1
APPLICATION NO. : 11/384536
DATED : June 9, 2009
INVENTOR(S) : Tadahiro Igawa It is certified that error appears in the above-identified patent and that said Letters Patent is hereby corrected as shown below:

Claim 6, Column 18, Line 44, after "deploying", delete "a".

Claim 7, Column 18, Line 49, delete "the the" and insert -- the --.

Signed and Sealed this

Thirteenth Day of October, 2009

David J. Kappos
*Director of the United States Patent and Trademark Office*